United States Patent [19]
Crowley et al.

[11] 3,922,550
[45] Nov. 25, 1975

[54] RADIOMETRIC SYSTEM

[75] Inventors: Arnold H. Crowley, Weston; Allan G. Dunn, Holbrook; Edward A. Scharfenberger, Sudbury, all of Mass.

[73] Assignee: Raytheon Company, Lexington, Mass.

[22] Filed: Dec. 28, 1973

[21] Appl. No.: 429,462

[52] U.S. Cl. ............ 250/338; 73/355 EM; 250/339
[51] Int. Cl.² .......................... G01J 1/00; G01J 5/00
[58] Field of Search ........ 250/339, 358, 338; 73/15, 73/355 R, 355 EM

[56] References Cited
UNITED STATES PATENTS

| | | | |
|---|---|---|---|
| 3,044,297 | 7/1962 | Hanken | 73/355 EM |
| 3,433,052 | 3/1969 | Maley | 73/15 |
| 3,451,254 | 6/1969 | Maley | 73/15 |
| 3,537,314 | 11/1970 | Svet | 73/355 EM |
| 3,698,813 | 10/1972 | Aisenberg | 73/355 EM |

*Primary Examiner*—Harold A. Dixon
*Attorney, Agent, or Firm*—John T. Meaney; Joseph D. Pannone; Harold A. Murphy

[57] ABSTRACT

A radiometric system for simultaneously measuring the temperature and the emissivity of a radiating body in accordance with theoretically derived data, the system comprising a pair of idealized brightness pyrometers suitably coupled to one another to constitute an idealized ratio pyrometer which produces temperature measurements in conformity with the theoretically derived data, and including means for comparing output signals from the ratio pyrometer with corresponding output signals from one of the brightness pyrometers to produce emissivity measurements of the radiating body.

21 Claims, 4 Drawing Figures

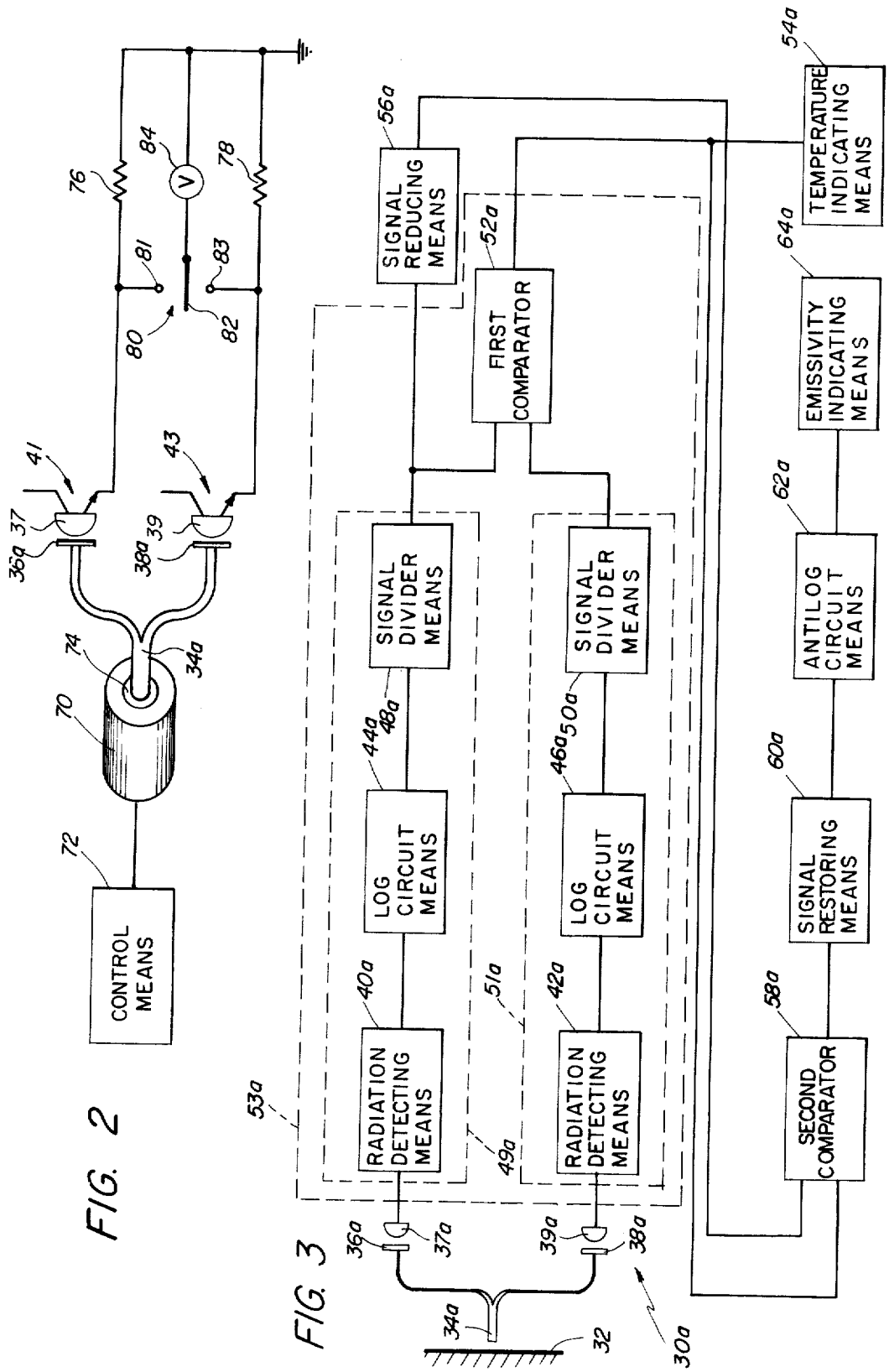

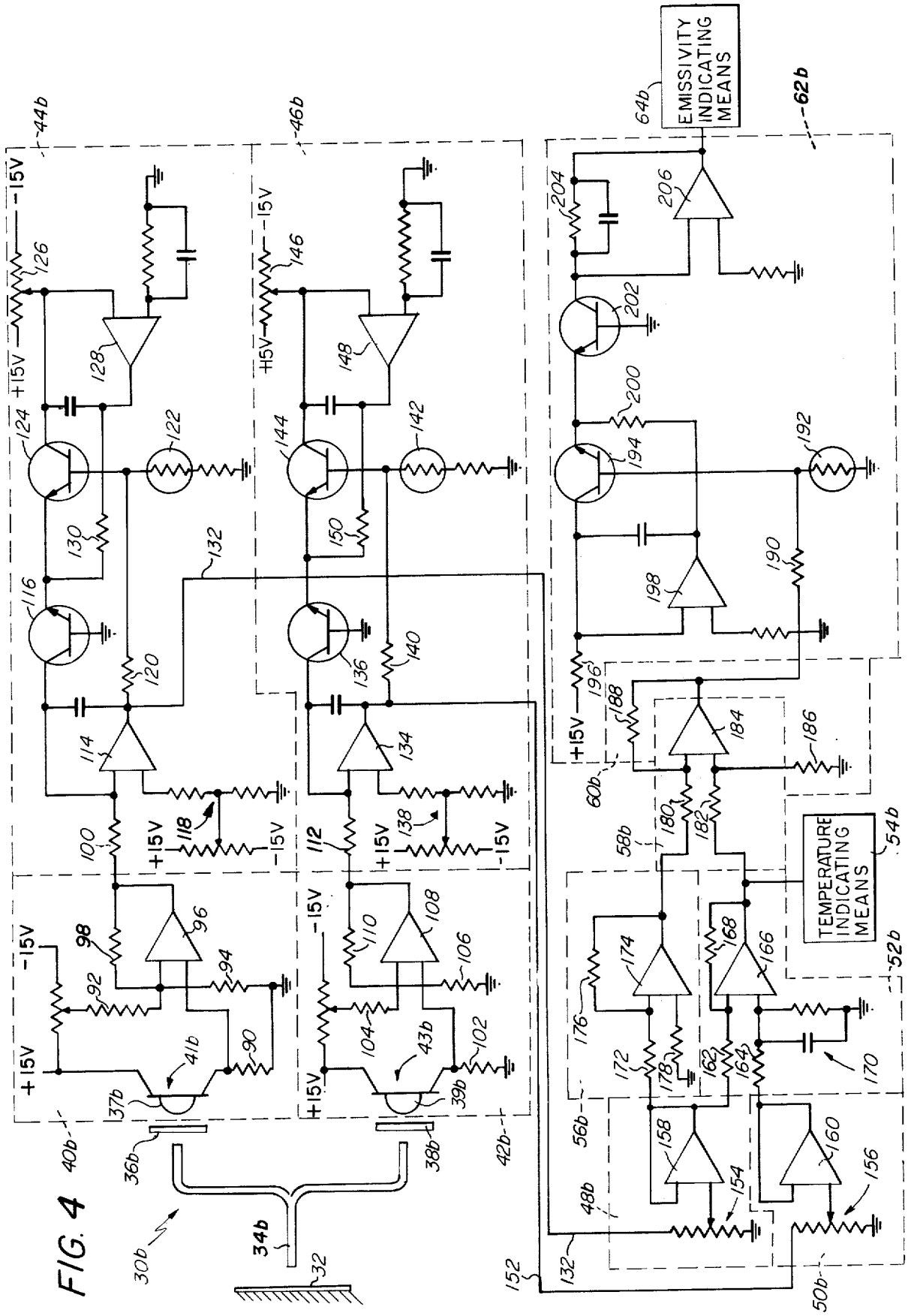

RADIOMETRIC SYSTEM

BACKGROUND OF THE INVENTION

This invention relates generally to radiometric systems and is concerned more particularly with means for simultaneously measuring the temperature and the emissivity of a radiating body.

Radiometric means for determining the surface temperature of a radiating body may include a pyrometer, which receives energy radiating from the surface and relates it to an associated temperature. A brightness pyrometer, for example, measures the radiation intensity in a narrow spectral band centered around a selected wavelength and correlates it with a corresponding surface temperature. However, the intensity of the radiation emanating from the surface under consideration is, in part, a function of the surface temperature and, in part, a function of the surface emissivity. Thus, if the surface emissivity is known, the surface temperature may be readily determined.

Since emissivity varies with the surface material, a brightness pyrometer may be provided with a calibration control which may be adjusted to compensate for the surface emissivity factor. However, adjustment of the calibration control requires accurate information concerning the emissivity characteristics of the radiating surface in order to obtain an accurate measurement of the surface temperature. Reference books, such as materials handbooks, physics books, and the like, provide emissivity values for a limited number of surface materials which have been measured under very controlled conditions. In practice, it has been found that emissivity may deviate from a given value due to variations in material composition, surface conditions, environmental factors, and the like. Consequently, it is desirable that the emissivity value of a particular surface material be determined for the actual operating conditions under which its temperature is to be measured.

In the operation of a pyrometer, radiation emanating from a surface of a radiating body usually is transmitted to radiation responsive means, such as a photoelectric detector, for example. The detector produces an electrical output signal which generally varies exponentially with changes in the surface temperature. However, it is preferred that the resulting output signal vary linearly with changes in the temperature of the radiating surface, in order to ease the problem of compensating for surface emissivity. Calibration of the pyrometer would be further simplified if the resulting output signal varied in accordance with the calculated output of a theoretical ideal detector. In practice, however, it has been found that commercially procured detectors produce output signals which deviate from the calculated output due to unpredictable alterations in construction of the devices, such as variations in material composition, structural inconsistencies, surface imperfections, impurities, and the like.

Thus, it is advantageous and desirable to provide a radiometric system having means for determining emissivity while measuring the temperature of a radiating surface under actual operating conditions, and having means for idealizing linearized output signals of a radiation detector such that the resulting signals conform to the calculated output of a theoretical ideal detector.

SUMMARY OF THE INVENTION

Accordingly, this invention provides a radiometric system for simultaneously measuring the temperature and the emissivity of a radiating surface. The system comprises a pair of idealized brightness pyrometers having respective output portions suitably connected to a signal ratio means, thus contituting an idealized ratio pyrometer. Each of the brightness pyrometers includes respective radiation selecting means, radiation responsive means, signal linearizing means, and signal idealizing means which are operatively connected to one another in the sequence mentioned. The brightness pyrometers receive respective radiation intensities from the radiating surface and produce corresponding idealized output signals, each of the signals having respective components related to an associated constant factor, surface emissivity, and surface temperature. However, the emissivity components produced by the respective brightness pyrometers are substantially equal in magnitude and, therefore, effectively cancel one another in the signal ratio means. As a result, the signal ratio means produces a corrresponding ratio output signal having a constant factor component and a surface temperature component. Therefore, an output signal produced by the signal ratio means is proportional to the surface temperature and, consequently, may be correlated with specific temperatures in a connected temperature indicating means for purposes of displaying the temperatures of the radiating surface.

This inventive system also includes means for comparing the output signal from one of the brightness pyrometers with the corresponding output signal from the signal ratio means to obtain a measurement of surface emissivity. Accordingly, suitably connected to the output of one of the brightness pyrometers is a signal conforming means which receives the output signal therefrom and reduces it uniformly in magnitude by a predetermined amount. As a result, the temperature component of the output signal from the conforming means equals in magnitude the temperature component in the output signal from the signal ratio means. A signal comparing means suitably connected to the signal conforming means and the signal ratio means receives the output signals therefrom and takes a ratio of the respective signals. Consequently, the temperature components of the respective signals effectively cancel one another and the signal comparing means produces an output signal having a constant factor component and a surface emissivity component.

A signal enhancing means operatively connected to the output of the signal comparing means receives the output signal therefrom and, after eliminating the constant factor component, amplifies the remaining emissivity component by the amount it was reduced in the signal conforming means. A signal delinearizing means suitably connected to the output of the signal enhancing means receives the amplified emissivity component signal and converts it to an exponentially varying signal which corresponds to an associated portion of the radiation intensity received from the radiating surface. Consequently, this resulting signal is indicative of the surface emissivity which may be displayed by an emissivity indicating means suitably connected to the output of signal delinearizing means.

BRIEF DESCRIPTION OF THE DRAWINGS

For a better understanding of this invention, the following more detailed description makes reference to the drawings wherein:

FIG. 2 is a schematic view of test apparatus which may be used in the practice of this invention;

FIG. 3 is a block diagrammatic view of a system which embodies the system shown in FIG. 1; and FIG. 4 is a circuit schematic view of a more specific system which embodies the system shown in FIG. 3.

DESCRIPTION OF THE PREFERRED EMBODIMENT

Figure 1:
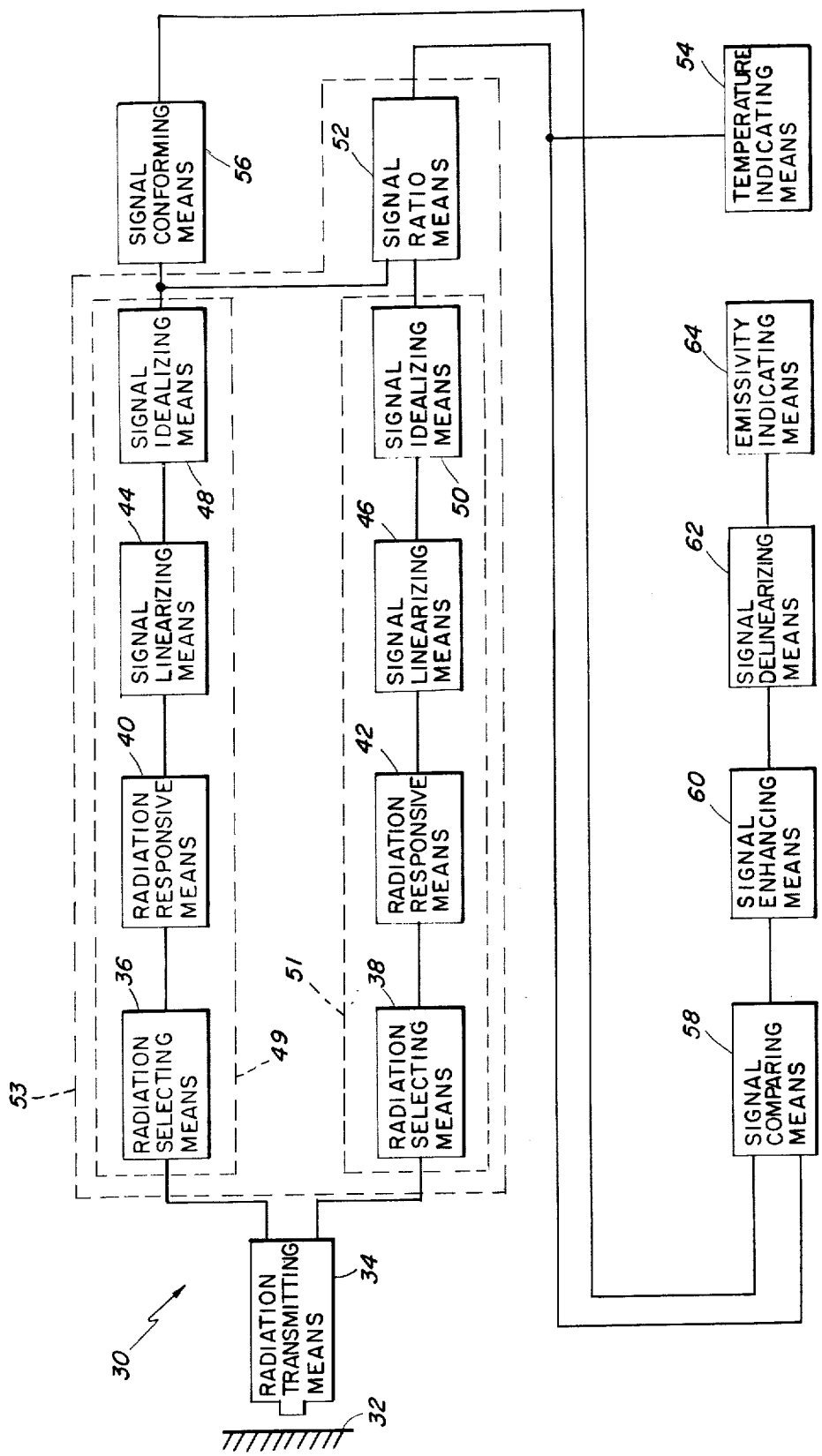
FIG. 1 is a block diagrammatic view of a preferred embodiment of this invention.

Referring to the drawings wherein like characters of reference designate like parts throughout the several views, there is shown in FIG. 1 a radiometric system 30 of this invention disposed for simultaneously measuring the temperature and the emissivity of a radiating surface 32. By use of the Stefan-Boltzmann Law, it can be shown that the intensity of radiant energy emanating from surface 32 is proportional to the surface emissivity and the fourth power of the surface temperature. Therefore, from measurements of radiation intensity, the temperature of surface 32 can be determined if the surface emissivity is known.

Accordingly, energy radiated from surface 32 is conveyed by radiation transmitting means 34 to a pair of radiation selecting means 36 and 38, respectively. Radiation selecting means 36 and 38 permit the passage of respective narrow bands of radiation, each having a predominant central wavelength. Since emissivity varies with wavelength, the selecting means 36 and 38 are designed to transmit respective central wavelengths which are suitably close to one another in the spectrum to provide an emissivity ratio substantially equal to one. However, the intensity of radiation transmitted through the selecting means 36 and 38, respectively, is dependent on the associated central wavelengths. Therefore, it is important that the central wavelengths not be sufficiently close to one another in the spectrum to represent an energy ratio substantially equal to one. This difference in the intensities of radiant energy transmitted through the respective selecting means 36 and 38 provides the basis for determining the temperature of surface 32.

Operatively coupled to the selecting means 36 and 38 are respective radiation responsive means 40 and 42 which receive the radiation transmitted through the associated selecting means. Consequently, the radiation responsive means 40 and 42 generate respective output signals which correspond to the intensity of the received radiation. Since radiation intensity is proportional to the fourth power of the surface temperature, the output signals produced by responsive means 40 and 42 vary exponentially with changes in the temperature of surface 32. However, operatively connected to the output portions of responsive means 40 and 42 are respective signal linearizing means 44 and 46 which receive the exponentially varying output signals. Accordingly, the signal linearizing means 44 and 46 produce respective output signals which correspond to their input signals but vary linearly with changes in the temperature of surface 32. Suitably connected to the output portions of signal linearizing means 44 and 46 are respective signal idealizing means 48 and 50 which receive the linearly varying output signals. As a result, the signal idealizing means 48 and 50 produce respective output signals which correspond to their input signals but vary in accordance with the calculated output of theoretically ideal radiation responsive means.

Output portions of the signal idealizing means 48 and 50 are electrically connected to respective input portions of a signal ratio means 52, whereby ratio means 52 receives two idealized input signals and produces a corresponding ratio output signal. The input signals are respective electrical equivalents of radiation intensity received by radiation responsive means 40 and 42, respectively. Consequently, each of the idealized input signals includes respective components related to an associated constant factor, surface emissivity, and the temperature of surface 32. However, the ratio of the respective emissivity components is substantially equal to one and, therefore, has negligible effect in the output signal produced by ratio means 52. As a result, signal ratio means 52 produces an idealized output signal which varies linearly with changes in surface temperature and, thus, may be correlated directly with the temperature of surface 32. Accordingly, the output of signal ratio means 52 is electrically connected to temperature indicating means 54 which is calibrated to display, when receiving an output signal from ratio means 52, the corresponding temperature of surface 32.

Thus, it may be seen that radiation selecting means 36, responsive means 40, linearizing means 44 and idealizing means 48 constitute a first idealized brightness pyrometer 49. Similarly, the radiation selecting means 38, responsive means 42, linearizing means 46 and idealizing means 50 constitute a second idealized brightness pyrometer 51. Furthermore, the first and second brightness pyrometers in conjunction with signal ratio means 52 constitute an idealized ratio pyrometer 53. The respective output signals produced by the first and second brightness pyrometers differ from one another in magnitude depending on the associated central wavelengths transmitted through the selecting means 36 and 38, respectively. However, both of the brightness pyrometers, 49 and 51, respectively, produce output signals having respective components related to associated constant factors, surface emissivity, and surface temperature. Thus, the output signals produced by the respective brightness pyrometers 49 and 51, although unequal in magnitude, are proportional to the emissivity and to the same temperature of surface 32. Consequently, either one of the respective brightness pyrometers alone would be suitable for measuring the temperature of surface 32 provided that the surface emissivity is known. Unfortunately, the emissivity factor usually is not known or cannot be readily applied to a particular operating environment.

The problem of inadequate information concerning emissivity is avoided in the ratio pyrometer 53 by the fact that radiation intensity varies characteristically with wavelength for any specified temperature of a radiating surface. Thus, the ratio of the respective radiation intensities transmitted through selecting means 36 and 38 provides a quantity which is indicative of the surface temperature. The radiation effects due to surface emissivity are eliminated by designing the selecting means 36 and 38 to transmit respective central wavelengths which are suitably close to one another in the spectrum for providing an emissivity ratio equal to one. Accordingly, the idealized ratio output signal produced by signal ratio means 52 basically comprises a ratio of the constant factor components and a ratio of the temperature components of the respective input signals from the first and second brightness pyrometers. The ratio of the constant factor components produces a quantity representative of a resulting constant factor; and the ratio of the temperature components produces a quantity indicative of the temperature of surface 32. Thus, the output signal produced by signal ratio means 52 is directly proportional to surface temperature and independent of surface emissivity.

In accordance with this invention, it is desirable to utilize the temperature component of the output signal produced by signal ratio means 52 for cancelling the temperature component of the output signal produced by one of the brightness pyrometers, 49 and 51, respectively. Since the signal produced by a brightness pyrometer is proportional to surface emissivity and surface temperature, cancelling the temperature component thereof will produce a resulting signal proportional only to surface emissivity. From the preceding ratio operation, it may be seen that the magnitude of the temperature component produced by signal ratio means 52 is less than the magnitude of the temperature component produced by either one of the brightness pyrometers, 49 and 50, respectively. However, since the output signals of the respective pyrometers are linearized and idealized, the differences in magnitude of the temperature components may be readily determined. Consequently, by applying an equalization factor to the output signal produced by either one of the brightness pyrometers, the associated temperature component thereof can be made equal in magnitude to the temperature component produced by signal ratio means 52. For purposes of illustrating this invention, the equalization factor will be applied to the output signal produced by the first brightness pyrometer 49.

Accordingly, the output portion of signal idealizing means 48 in addition to being connected to a respective input portion of signal ratio means 52 also is electrically connected to an input portion of a signal conforming means 56. As a result, the output signal produced by idealizing means 48 is received as an input signal by the conforming means 56 wherein an equalization factor is applied to the input signal. Consequently, the signal conforming means 56 produces an idealized output signal having respective components relating to an associated constant factor, surface emissivity, and surface temperature which have been uniformly reduced in magnitude as compared to the corresponding components of the input signal. However, the temperature component produced by the conforming means 56 is equal in magnitude to the temperature component produced by signal ratio means 52.

The output portion of signal ratio means 52 in addition to being connected to the temperature indicating means 54 also is electrically connected to a respective input portion of a signal comparing means 58. Another respective input portion of the comparing means 58 is similarly connected to the output portion of signal conforming means 56. Thus, the signal comparing means 58 receives two idealized input signals having equal components related to surface temperature; but only the input signal from conforming means 56 has a component related to surface emissivity. As a result of a ratio operation performed on the two input signals by the signal comparing means 58, the temperature components of the respective input signals effectively cancel one another. Consequently, the corresponding idealized output signal produced by signal comparing means 58 basically comprises a component related to an associated constant factor, and a component related to the emissivity of surface 32.

Since the output signal produced by the comparing means 58 is linearized and idealized, the magnitude of the constant factor component thereof also may be readily determined. Consequently, the constant factor component produced by signal comparing means 58 may be eliminated by suitable means, as by combining it with an oppositely polarized signal having an equal magnitude, for example. Accordingly, the output portion of comparing means 58 is electrically connected to a signal enhancing means 60 which receives the output signal therefrom as an input signal. As a result, the enhancing means 60 eliminates the constant factor component from the input signal and amplifies the remaining emissivity component by the amount it was reduced in the signal conforming means 56. Thus, the enhancing means 60 produces a linearized output signal which is equal in magnitude with respect to the emissivity component produced by the first brightness pyrometer 49.

An output portion of the enhancing means 60 is electrically connected to an input portion of a signal delinearizing means 62 which receives the output signal therefrom and converts it into a nonlinear signal. As a result, the delinearizing means 62 produces an output signal which corresponds to the emissivity component of the output signal produced by radiation responsive means 40. Since radiation responsive means 40 generated the output signal in proportion to radiation intensity received from surface 12, the corresponding emissivity component of the signal produced by delinearizing means 62 is indicative of the emissivity of surface 32. Consequently, the output of delinearizing means 62 is electrically connected to an emissivity indicating means 64 which receives the signal therefrom and is calibrated to display the corresponding numerical value of the emissivity of surface 12 relative to an emissivity value of one for a black body radiator.

A mathematical analysis forming the basis of the described system is derived from a consideration of a theoretically ideal brightness pyrometer. The brightness pyrometer is adapted to receive from a radiating surface a narrow spectral bandwidth of radiation and to convert it, by means of an ideal linear detector, into a corresponding electrical signal. In terms of electrical power, the theoretical output of a brightness pyrometer when receiving radiant energy from a heated surface may be described by the equation:

$$H(\lambda) = KeT^4 \qquad (1)$$

where H is the output of an ideal linear detector, $\lambda$ is the central wavelength of the narrow spectral band, K is an all-inclusive constant, $e$ is the emissivity of the radiating surface, and T is the temperature of the surface in degrees Kelvin. The constant K includes Stefan-Boltzmann's constant and also may include a bandwidth factor relating to the effective wavelength range of the detector. However, with a wide bandwidth detector having a receiving aperture smaller than the radiating surface, the bandwidth factor may be taken as equal to one. The emissivity, $e$, is a dimensionless quantity having a value of one for black body radiating surfaces and varying from slightly less than one to zero for other radiating surfaces. Thus, it may be seen that equation (1) is a practical form of the Stefan-Boltzmann law which states that the radiant power emitted per unit area of a black body radiating surface is directly proportional to the fourth power of the surface temperature.

Using Wien's Law and assumung a central wavelength of 9500 angstroms, for example, the output (H) of the ideal linear detector was calculated for a series of black body temperatures (T). The results were plotted to obtain a detector output verses surface temperature curve for the 9500 angstroms wavelength. The calculated results also were used to find, as by means of a computer, for example, a $T^n$ curve which conformed closely to the plotted detector output verses temperature curve. It was found that a $T^{10}$ curve fitted the detector output versus temperature curve within approximately three percent. Thus, equation (1) may be rewritten for 9500 angstroms as follows:

$$H(9500A.) = K_1 T^{10} \quad (2)$$

The emissivity factor (e) in equation (1) may be omitted from equation (2) since the emissivity of a black body radiator is equal to one. Similarly, it was determined that equation (1) may be rewritten for 8000 angstroms, for example, as:

$$H(8000A.) = K_2 T^{12} \quad (3)$$

Thus, it may be seen from equations (2) and (3), respectively, that an ideal linear detector receiving radiation from a black body source has an output directly proportional to temperature. However, the detector, when receiving 8000 angstrom radiation, produces an output signal which is two orders of magnitude greater than when the detector is receiving 9500 angstrom radiation. The exponentially varying curves represented by equations (2) and (3), respectively, may be linearized by taking the log 10 of each equation as follows:

$$\log 10\ H(9500A.) = \log K_1 + 10 \log T \quad (4)$$
$$\log 10\ H(8000A.) = \log K_2 + 12 \log T \quad (5)$$

From equations (4) and (5), it may be seen that the respective slopes of the resulting linear curves are equal to the exponents of the surface temperature in equations (3) and (4), respectively.

Actual response curves of commercially procured detectors, when receiving a narrow spectral band of black body radiation, may be obtained by means of suitable test apparatus, as shown in FIG. 2, for example. The required radiant energy may be supplied by a black body source 70 of the electrically powered type, such as sold by Infrared Industries of Santa Barbara, Calif. under the designation Model 436, for example, which has an emissivity equal to one within one percent accuracy. The source 70 is provided with a control means 72 which usually includes a current adjusting means (not shown), such as a rheostat of the conventional type, for example. Thus, current supplied to the black body source 50 may be varied to cause a corresponding change in the temperature of the source. The control means 72 also may include a black body temperature indicating means (not shown), such as a conventional thermocouple, for example.

Radiation emitted from source 70 through an end aperture 74 may be transmitted with minimal loss through suitable radiation conduit means, such as a bifurcated fiber optic bundle 34a, for example. The bundle 34a has a common end directed toward the aperture 74 of source 70 and a split pair of opposing ends, each of which terminates in abutting relationship with a respective radiation filter, 36a and 38a. The filters 36a and 38a, preferably, are of the spike filter type, such as sold by Infrared Industries of Waltham, Mass., for example, which permit the passage of only a respective narrow spectral band of radiation having a preselected central wavelength of interest. For purposes of illustrating this invention, it will be assumed that the spectral bands of radiation transmitted through filters 36a and 38a are centered around wavelengths 9500 angstroms and 8000 angstroms, respectively.

The radiation transmitted through filters 36a and 38a may be directed by suitable focussing means, such as respective lenses 37 and 39, for example, onto aligned photosensitive regions of radiation detectors 41 and 43, respectively. The detectors 41 and 43 comprise radiation responsive means of any suitable type, such as LS100 semiconductor sensors of the NPN silicon type sold by Texas Instruments of Dallas, Texas, for example. The detectors 41 and 43 may have appropriate DC voltages, such as fifteen volts, for example, applied to their respective collector electrodes. The respective emitter electrodes of the detectors 41 and 43 may be connected through load resistors 76 and 78, respectively, to electrical ground. Also, the emitter electrodes of the detectors 41 and 43, respectively, may be connected electrically to respective contacts 81 and 83 of a SPDT switch 80. A movable contact arm 82 of switch 80 may be connected to electrical ground through the input of a suitable voltage indicating means 84, such as digital voltmeter Model 5500 sold by Dana Laboratories, Inc. of Irvine, Calif., for example.

In the operation of the test apparatus shown in FIG. 2, the control means 72 was adjusted to bring the black body source 70 sequentially through a series of selected temperature values. The resulting radiation emanating from aperture 74 of source 70 was transmitted through the fiber optic bundle 34a to respective filters 36a and 38a which, in turn, transmitted only narrow bands of the radiation centered around 9500 angstroms and 8000 angstroms, respectively. The bands of radiation, thus selected, were directed by respective focussing lenses 37 and 39 onto aligned base regions of the detectors 41 and 43, respectively. Accordingly, the detectors 41 and 43 were rendered sufficiently conductive to permit the passage of respective electrical currents corresponding in magnitude to the intensity of the impinging radiation. The electrical signals thus generated by the respective detectors 41 and 43 flowed to electrical ground through the connected load resistors 76 and 78, respectively, thereby generating corresponding voltage drops across the respective load resistors. By actuating the movable contact arm 82 of switch 80 to engage the respective contacts 81 and 83 alternatively, the voltage drops developed across the load resistors 76 and 78 were read on the digital voltmeter 84. Thus, for each of the selected temperatures of source 70, corresponding voltage output readings were obtained for the commercially procured detectors 41 and 43, respectively.

The voltage readings thus obtained were plotted to produce a pair of detector output versus temperature curves, one for the voltage values associated with 9500 angstroms wavelength and the other for voltage values associated with 8000 angstroms wavelength. The voltage data also was used to find, as by a linear regression analysis computer program, for example, a pair of $T^n$ curves which conformed closely to the plotted curves. Accordingly, it was found that the plotted curves may be expressed in the form of equation (1) as follows:

$$V(9500A.) = (5.294 \times 10^{-46}) T^{13.49} \quad (6)$$
$$V(8000A.) = (1.214 \times 10^{-59}) T^{19.011} \quad (7)$$

The emissivity terms may be omitted from equations (6) and (7), respectively, since the emissivity of black body source 50 is equal to one. Thus, it may be seen that the output signal produced by a commercially procured detector also is proportional to surface temperature when receiving radiation from a black body source. However, the commercially procured detector may produce an output signal of substantially greater magnitude than the corresponding signal produced by the ideal linear detector when exposed to the same wavelength radiation. It is theorized that this difference in magnitude is due to unpredictable properties of the commercially procured detector, such as material defects, surface imperfections, occluded foreign matter and the like.

The exponentially varying curves represented by equations (6) and (7), respectively, may be linearized by taking the log 10 to obtain the following equations:

$$\log 10 \, V(9500A.) = \log 5.294 \times 10^{-48} + 15.49 \log T \quad (8)$$
$$\log 10 \, V(8000A.) = \log 1.214 \times 10^{-59} + 19.012 \log T \quad (9)$$

Thus, equation (8) represents a linear curve having a slope which differs by a factor of 1.549 from the slope of the corresponding ideal linear curve represented by equation (4). Similarly, equation (9) represents a linear curve having a slope which differs by a factor of 1.585 from the slope of the corresponding ideal linear curve represented by equation (5). Consequently, respective equations (8) and (9) may be idealized by dividing these equations by the slope differential factors of 1.549 and 1.585, respectively. As a result, the following idealized form of equations (8) and (9), respectively, are obtained:

$$\log 10 \, V(9500A.)/1.549 = -30.6 + 10 \log T \quad (10)$$
$$\log 10 \, V(8000A.)/1.585 = -37 + 12 \log T \quad (11)$$

Accordingly, the respective linearized and idealized output signals produced by the first and second brightness pyrometers shown in FIG. 1 may be expressed as:

$$V(48) = -30.6 + \log e + 10 \log T \quad (12)$$
$$V(50) = -37 + \log e + 12 \log T \quad (13)$$

where V(48) and V(50) are the output voltage signals produced by the idealizing means, 48 and 50, respectively. The log $e$ term in equations (12) and (13) represents a linearized quantity related to the difference in radiation received from surface 32 as compared to the radiation intensity received from block body source 70 under similar operating conditions. Consequently, the output of the ratio pyrometer 53 may be determined by taking the ratio of equations (12) and (13) to obtain:

$$V(52) = -6.4 + 2 \log T \quad (14)$$

Thus, the linearized and idealized output signal produced by ratio means 52 is proportional to the surface temperature and independent of surface emissivity. Therefore, it may be correlated directly with a specific temperature in the temperature indicating means 54.

From equations (12) and (14), it may be seen that the temperature components thereof differ in magnitude by a factor of five. Accordingly, the temperature component of equation (12) may be made equal in magnitude to the temperature component of equation (14) by dividing equation (12) by an equalization factor of five to obtain:

$$V(56) = -6.1 + 1/5 \log e + 2 \log T \quad (15)$$

Thus, the output signal produced by the signal conforming means 56, as compared to the input signal, has respective constant factor, surface emissivity, and surface temperature components uniformly reduced in magnitude. Consequently, the temperature component produced by conforming means 56 is now equal in magnitude to the temperature component produced by comparator device 52. Therefore, the temperature component can be eliminated from the output signal produced by conforming means 56 by taking the ratio of equations (14) and (15) to obtain:

$$V(58) = 0.300 + 1/5 \log e \quad (16)$$

As a result, the output signal produced by signal comparing means 58 is independent of surface temperature and basically comprises a constant factor component and an emissivity component.

since the value of the constant factor component of the output signal produced by the second comparator device 58 is known, it may be eliminated by an oppositely polarized signal of equal magnitude added algebraically to the signal. The remaining emissivity component may be restored to the value shown in equation (12) by multiplying it by the equalization factor of five with which it was divided in signal conforming means 56. Consequently, the output signal produced by enhancing means 60 may be expressed as:

$$V(60) = \log e \quad (17)$$

where log $e$ is equal to the emissivity component of the output signal produced by the first brightness pyrometer 49, as represented by equation (12). Accordingly, the antilog of equation (17) may be taken to obtain the output signal produced by delinearizing means 62, which may be expressed as:

$$V(62) = e \quad (18)$$

where $e$ is the emissivity value of surface 32 when receiving radiation of approximately 9500 angstroms. In a similar manner, the emissivity values of surface 32 for other wavelengths may be determined to produce a curve of emissivity versus wavelength for the radiating surface 32.

From the foregoing, it may be seen that the radiometric system 30 shown in FIG. 1 may be embodied in a radiometric system 30a shown in FIG. 3. The system 30a includes a radiation transmitting means comprising bifurcated fiber optic bundle 34a having a common end directed toward the radiating surface 32 and a split pair of opposing ends which terminate in abutting relationship with respective filters 36a and 38a. The filters 36a and 38a constitute respective radiation selecting means for transmitting narrow bands of radiation centered around associated wavelengths which are suitably close in the spectrum to provide an emissivity ratio substantially equal to one. For purposes of illustration, it will be assumed that the filters 36a and 38a transmit central wavelengths of 9500 angstroms and 8000 angstroms, respectively.

Filters 36a and 38a are operatively coupled, as by respective lenses 37a and 39a, for example, to radiation detecting means 40a and 42a, respectively. The detecting means 40a and 42a constitute respective radiation responsive means and may comprise semiconductor detectors 41 and 43, respectively, as shown in FIG. 2, for example. Output portions of radiation detecting means 40a and 42a are electrically connected to log circuit means 44a and 46a, respectively, which constitute respective signal linearizing means. The log means 44a and 46a have output portions electrically connected to signal divider means 48a and 50a, respectively, which constitute respective signal idealizing means.

Accordingly, radiation emanating from surface 32 is conveyed by way of fiber optic bundle 34a to respective filters 36a and 38a which selectively transmit respective radiation intensities to the coupled detecting means 40a and 42a, respectively. Consequently, the detecting means 40a and 42a generate respective electrical signals which correspond in magnitude to the intensity of the incident radiation, and, therefore, very exponentially with changes in temperature of surface 32. The log circuit means 44a and 46a convert the exponentially varying signals received from detecting means 40a and 42a, respectively, into logarithmic form to produce corresponding output signals which vary linearly with changes in temperature of surface 32. The output signals produced by log circuit means 44a and 46a are received by respective signal divider means 48a and 50a which electrically divide the linearly varying signals by electrical equivalents of idealizing factors equal to 1.549 and 1.901, respectiely. Consequently, the signal divider means 48a and 50a produce idealized linearly varying signals which conform to calculated data of respective theoretically ideal detecting means.

Thus, filter 36a, detecting means 40a, log circuit means 44a, and signal divider means 48a constitute a first brightness pyrometer 49a. Similarly, filter 38a, detecting means 42a, log circuit means 46a and signal divider means 50a constitute a second brightness pyrometer 51a. Both of the brightness pyrometers produce output signals having respective components related to associated constant factors, surface emissivity, and surface temperature as represented by equations (12) and (13). However, the emissivity components of the output signals produced by each of the brightness pyrometers, 49a and 51a, respectively, are equal to one another. Consequently, output portions of the signal divider means 48a and 50a are connectd electrically to respective input portions of a first comparator device 52a. The comparator 52a electrically subtracts one signal from the other, since the signals are in logarithmic form, to produce a corresponding ratio signal. Consequently, the emissivity components of the respective input signals effectively cancel one another since they are equal in magnitude. As a result, the output signal produced by first comparator 52a is comprised of a constant factor component and a surface temperature component, as shown in equation (14). Thus, the comparator device 52a produces an idealized output signal which is independent of surface emissivity and varies proportionally with changes in surface temperature. Accordingly, the output signal from first comparator 52a may be correlated with a specific temperature in an electically connected temperature indicating means 54a for the purpose of displaying the temperature of surface 32.

The signal divider means 48a, for example, also is electrically connected to a signal reducing means 56a which receives the signal therefrom and electrically divides it by five. As a result, the reducing means 56a produces an output signal having respective constant factor, emissivity, and surface temperature components uniformly reduced in magnitude to one-fifth of the input signal, as shown in equation (15). Consequently, the temperature component of the output signal from reducing means 56a is equal in magnitude to the temperature component produced by the first comparator device 52a. Accordingly, the signal reducing means 56a and the first comparator device 52a are electrically connected to a second comparator device 58a which receives respective input signals therefrom. The second comparator 58a electrically subtracts one input signal from the other to produce a corresponding ratio output signal. Thus, the temperature components of the respective input signals effectively cancel one another since they are equal in magnitude. Therefore, the output signal from the second comparator device 58a comprises a constant factor component and an emissivity component, as shown in equation (16). The second comparator device 58a is electrically connected to a respective input portion of a signal restoring means 60a which receives the output signal therefrom. Another respective input portion of the signal restoring means 60a is suitably connected to a signal source (not shown) of the conventional type which supplies a contrast voltage signal equal in magnitude but opposite in polarity to the constant factor component produced by the second comparator device 58a. The restoring means 60a, in effect, algebraically adds the respective input signals such that the constant factor component and the oppositely polarized input signal cancel one another. The remaining emissivity component is electrically multiplied by five to restore it to the magnitude it has before entering the signal reducing means 56a. Thus, the signal restoring means 60a produces a linearized output signal which is equal to the emissivity component of the output signal produced by the first brightness pyrometer 49a, as shown by a comparison of equations (12) and (17).

The output signal from signal restoring means 60a flows to an electrically connected antilog circuit means 62a which converts the linearized input signal to a corresponding nonlinear signal, as represented by equation (18). Therefore, the antilog circuit means 62a produces an output signal which is equivalent to the emissivity component of the corresponding output signal produced by the radiation detecting means 40a. Since the output signal from detecting means 40a was generated in proportion to the intensity of radiation received from the surface 32, the emissivity component thereof is indicative of the surface emissivity. Consequently, the output of the antilog circuit means 62a is electrically connected to an emissivity indicating means 64a which receives the output signal therefrom. The indicating means 64a is calibrated, as by means of the black body radiator 70 shown in FIG. 2, for example, to display a numerical emissivity value which corresponds to the input signal received from the antilog circuit means 62a.

A typical embodiment of the described system 30a is shown in FIG. 4 as a radiometric system 30b disposed for measuring the temperature and emissivity of a radiating surface 32. The system 30b includes a fiber optic bundle 34b having a common end directed toward surface 32 and a split pair of opposing ends terminating adjacent respective filters 36b and 38b. The filters 36b and 38b transmit respective narrow bands of radiation centered around associated wavelengths of 9500 angstroms and 8000 angstroms, respectively. Respective radiation intensities transmitted through the filters 36b and 38b are directed toward radiation detecting means 40b and 42b, respectively.

The detecting means 40b is provided with a lens 37b which focuses the radiation intensity transmitted through filter 36b onto an aligned base region of a semiconductor detector 41b. The detector 41b is connected with respective resistors 90, 92 and 94 into a bridge network which has a pair of output leads connected to respective input terminals of an isolation amplifier 96. The output of amplifier 96 is connected to a feedback resistor 98 and also to the input resistor 100 of a conventional type log circuit 44b. Similarly, the detecting means 42b is provided with a lens 39b which focuses the radiation intensity transmitted through filter 38b onto an aligned base region of a semiconductor detector 43b. The detector 43b is connected with respective resistors 102, 104 and 106 into a bridge network which has a pair of output leads connected to respective input terminals of an isolation amplifier 108. The output amplifier 108 is connected to a feedback resistor 110 and also to the input resistor 112 of a conventional type log circuit 46b. Thus, the respective radiation intensities transmitted through filters 36b and 38b cause the detectors 41b and 43b to generate respective corresponding output signals which vary exponentially with changes in temperature of surface 32. The respective output signals produced by detecting means 40b and 42b are conducted to log circuits 44b and 46b, respectively.

In log circuit means 44b, the input resistor 100 is connected to one input terminal of an operational amplifier 114 and to the collector of a negative feedback transistor 116, the other input terminal of amplifier 114 being connected to a voltage offset network 118. The output of amplifier 114 is connected to electrical ground through a voltage divider comprising a load resistor 120 and a series connected thermistor 122 which compensates for changes in ambient temperature. Negative feedback is applied through the voltage divider and the base emitter of a second transistor 124 which matches the feedback transistor 116. Transistor 124 in conjunction with a constant voltage source 126, a second operational amplifier 128, and a respective load resistor 130 serves as a constant current reference source for the feedback transistor 116. Thus, the exponentially varying signal from detecting means 40b is converted to natural log form by action of the feedback transistor 116 and converted to log 10 form by action of the load resistor 120. Consequently, a linearized signal corresponding to the exponentially varying signal produced by detecting means 40b flows out of log circuit means 44b by way of output lead 132.

Similarly, in log circuit means 46b, the input resistor 112 is connected to one input terminal of an operational amplifier 134 and the collector of a negative feedback transistor 136, the other input terminal of amplifier 134 being connected to a voltage offset network 138. The output of amplifier 134 is connected to electrical ground through a voltage divider comprising a load resistor 140 and a series connected thermistor 142. Negative feedback is applied through the voltage divider and the base-emitter of a second transistor 144 which matches the feedback transistor 136. The transistor 144 in cooperation with a constant voltage source 146, a second operational amplifier 148, and a respective load resistor 150 sseres as a constant current reference source for feedback transistor 136. Accordingly, the exponentially varying signal from detecting means 42b is converted to natural log form by the feedback effect of transistor 136 and converted to log 10 form by the load resistor 140. As a result, a linearized signal corresponding to the exponentially varying signal produced by detecting means 42b is conducted out of the log circuit means 46b via output lead 152.

Output leads 132 and 152, respectively, conduct the linearized signals from log circuit means 44b and 46b to respective signal divider means 48b and 50b, each of which includes a voltage divider, 154 and 156, respectively. The linearized signals flow to electrical ground through resistive elements of the voltage dividers 154 and 156, respectively, thereby developing corresponding voltage signals across the associated resistive elements. Respective movable taps of the voltage dividers 154 and 156 are positioned in electrical contact with the associated resistive elements to pick off 1/1.549 and 1/1.585, respectively, of the corresponding voltage signals thus developed. Consequently, idealized linear signals, which comply with theoretically derived data, flow from the voltage dividers 154 and 156 to connected input terminals of respective isolation amplifiers 158 and 160. Each of the amplifiers 158 and 160, respectively, has another input terminal latched to the output terminal thereof. Accordingly, the idealized linear signals from the respective voltage dividers 158 and 160 are reproduced substantially unchanged at the output terminals of isolation amplifiers 158 and 160, respectively.

The idealized linear output signals produced by signal divider means 48b and 50b, respectively, are conducted to respective input resistors 162 and 164 of a first comparator device 52b. Input resistor 162 is connected to one input terminal of a differential amplifier 166, and also to a feedback resistor 168 which, in turn, is connected to the output of amplifier 166. The other input resistor 164 is connected to a second input terminal of differential amplifier 166, and also to a voltage offset network 170. Feedback resistor 168, preferaby, is equal in ohmic value to the connected input resistor 162 and, consequently, does not alter a signal passing through the input resistor 162. Accordingly, the output signals from isolation amplifier 158 and 160, respectively, flow through respective input resistors 162 and 164 to the connected input terminals of differential amplifier 166. In amplifier 166, the two input signals are compared with one another and the difference is extracted thereby subtracting one input signal from the other. However, since the input signals are in logarithmic form, the subtracting operation is equivalent to dividing the corresponding nonlinear signals to obtain a resulting ratio quantity.

Thus, filter 36b, detecting means 40b, log circuit means 44b, and signal divider means 48b comprise a first brightness pyrometer. Similarly, filter 38b, detecting means 42b, log circuit means 46b, and signal divider means 50b constitute a second brightness pyrometer. Also, the first and second brightness pyrometers in conjunction with the first comparator device 52 comprise a ratio pyrometer. Each of the brightness pyrometers produces an idealized linear signal having respective components related to an associated constant factor, surface emissivity, and surface temperature. However, the respective emissivity components of output signals produced by the first and second pyrometers are substantially equal to one another in magnitude. Therefore, in the differential amplifier 166, the emissivity components of the two input signals effectively cancel one another; and the corresponding output signal is comprised of a constant factor component and a surface temperature component. Thus, the first comparator 52b produces an output signal which varies in proportion to changes in surface temperature and, consequently, can be correlated with specific temperatures of radiating surface 32. Accordingly, the output of differential amplifier 166 is connected to a temperature indicating means 54b which may be calibrated to display numerical values of temperature which correspond to associated signals received from the first comparator 52b.

The output signal from isolation amplifier 158 of signal divider means 48b also is conducted to an input resistor of a signal reducing means 56b. Resistor 172 is connected to one input terminal of an operational amplifier 174 and to a feedback resistor 176 which, in turn, is connected to the output of amplifier 174. Another input terminal of operational amplifier 174 is connected through a voltage offset resistor 178 to electrical ground. The ohmic value of feedback back resistor 176 is approximately one-fifth the ohmic value of input resistor 172 and, consequently, has the effect of dividing an input signal from signal divider means 48b by five. Thus, the signal reducing means 56b receives an input signal from the first brightness pyrometer and produces a corresponding output signal having a magnitude approximately equal to one-fifth of the magnitude of the input signal. As a result, the respective constant factor, emissivity, and surface temperature components of the output signal are uniformly reduced to one-fifth the magnitude of the equivalent components of the input signal. Thus, the temperature component of the output signal from the signal reducing means 56b is substantially equal in magnitude to the temperature component of the output signal produced by the first comparator 52b.

The output signals produced by signal divider means 56b and first comparator 52b, respectively, are conducted to respective input resistors 180 and 182 of a second comparator device 58b. The input signals flow through resistors 180 and 182 to respectively connected input terminals of a differential amplifier 184. In amplifier 184, the two input signals are compared with one another and the difference is extracted, which is equivalent to dividing corresponding nonlinear signals to obtain a resulting ratio quantity. Accordingly, since the temperature components of the respective input signals are equal in magnitude, they effectively cancel one another in the differential amplifier 184. Consequently, the second comparator 58b produces an output signal comprised of a constant factor component and an emissivity component.

The input resistor 182 and the connected input terminal of differential amplifier 184 are coupled to electrical ground through a resistor 186 of a signal restoring means 60b. The ohmic value of resistor 186 is substantially equal to the ohmic value of resistor 182 which has the effect of introducing a signal equal in magnitude but opposite in polarity to the constant factor component of the output signal produced by amplifier 184. As a result, the constant factor component of the output signal from second comparator 58b is eliminated thereby leaving only the emissivity component of the output signal.

Signal restoring means 60 also includes a feedback resistor 188 which is connected between the output of amplifier 184 and the junction of input resistor 180 with the associated input terminal of amplifier 184. The ohmic value of feeback resistor 188 is approximately five times greater than the ohmic value of input resistor which results in the remaining emissivity component being multiplied by five. Thus, the emissivity component is amplified by the amount that it was reduced in signal reducing means 56b. Consequently, the restoring means 60b produces an output signal which corresponds to the emissivity component of the output signal generated by the first brightness pyrometer.

The output signal from restoring means 60b is conducted to an input resistor 190 of an antilog circuit means 62b. Resistor 190 in conjunction with a thermistor 192 is connected to a base electrode of a transistor 194. The transistor 194 in cooperation with a constant voltage source 196, an operational amplifier 198 and a load resistor 200 serves as a constant current reference source for a transistor 202 which matches the transistor 194. The transistor 202 is connected to a feedback resistor 204 of an operational amplifier 206. Thus, the input signal from restoring means 60b is converted to natural log form by the operation of transistor 202 and converted to an exponentially varying signal by the action of resistor 204 and operational amplifier 206. Consequently, the antilog circuit means 62b produces an exponentially varying signal which corresponds to the emissivity component of the output signal generated by detecting means 40b.

Accordingly, the signal produced by antilog circuit means 62 is indicative of the surface emissivity and may be correlated with specific values of emissivity. Therefore, the output of operational amplifier 206 is connected to an emissivity indicating means 64b, such as digital voltmeter 84 shown in FIG. 2, for example. The emissivity indicating means 64b may be calibrated by directing the common end of fiber optic bundle 34b toward a black body radiating surface, as shown in FIG. 2, for example, and adjusting the emissivity indicating means 64b to display an emissivity value of one. Consequently, when the common end of the fiber optic bundle 34b is directed toward a radiating surface, such as 32, for example, the emissivity means will display an accurate emissivity value of the surface.

Thus, there has been disclosed herein a method for idealizing the output of an actual detector such that the resulting signal conforms closely to the calculated output of an ideal linear detector receiving black body radiation. This method comprises the steps of: calculating the output of an ideal linear detector for a particular wavelength of black body radiation and a series of selected temperature values; plotting the calculated values to obtain an ideal detector output versus black body temperature curve; finding a $T^n$ curve equation having a constant factor and an exponentially variable temperature factor which conforms closely to the plotted curve of calculated values; taking the log 10 of the equation to obtain a calculated value equation of a linear curve having a slope equal to $n$; measuring the output of an actual detector receiving the particular wavelength of black body radiation for a series of selected temperatures; plotting the measured values to obtain an actual detector output versus black body temperature curve; finding a $T^{nm}$ curve equation having a constant factor and an exponentially variable temperature factor which conforms closely to the plotted curve of measured values; taking the log 10 of the equation to obtain a resulting measured value equation of a linear curve having a slope equal to $nm$; dividing the resulting measured value equation by the factor $m$ to obtain a measured value equation of a linear curve having a slope equal to $n$.

There also has been disclosed herein an idealized ratio pyrometer for measuring the temperature of a radiating body. The idealized ratio pyrometer comprises two idealized brightness pyrometers operatively connected to a signal ratio means having an output proportional to the temperature of the radiating body. Each of the brightness pyrometers includes, respectively, a radiation selecting means for permitting the passage of an associated wavelength of radiation intensity from the radiating body. The wavelength being suitably close in the spectrum to the wavelength associated with the other brightness pyrometer to provide an emissivity ratio of one; a radiation detecting means for receiving the associated wavelength of radiation and producing an exponentially varying signal corresponding to the intensity of the received radiation; a signal linearizing means for receiving the exponentially varying signal and producing a corresponding linearly varying signal; and signal idealizing means for receiving the linearly varying signal and producing a corresponding idealized signal which conforms to the calculated output of a linear ideal detector receiving the same wavelength of black body radiation.

There also has been disclosed herein a radiometric system for simultaneously measuring the temperature and the emissivity of a radiating body under actual operating conditions. The system comprises an idealized ratio pyrometer including two idealized brightness pyrometers operatively connected to a signal ratio means, the brightness pyrometers having means for producing respective signals comprised of constant factor, emissivity and temperature components which result in the signal ratio means producing an output signal comprised of constant factor and body temperature components. The output of the signal ratio means is connected to a temperature indicating means for displaying temperature values corresponding to signal received from the signal ratio means.

The output of one of the brightness pyrometers is connected to a signal conforming means for reducing the magnitude of the signal received therefrom such that the resulting temperature component substantially equals the temperature component of the output signal produced by the signal ratio means. The signal conforming means and the signal ratio means are suitably connected to a signal comparing means for receiving respective output signals therefrom and producing a ratio output signal having constant factor and emissivity components. The signal comparing means is connected to a signal enhancing means for receiving the output signal therefrom, eliminating the constant factor component, and increasing the emissivity component by the amount it was reduced in the signal conforming means. The signal enhancing means, in turn, is connected to a signal delinearizing means for receiving the signal therefrom and producing a corresponding exponentially varying signal. The output of the signal delinearizing means is operatively connected to an emissivity indicating means for receiving the output signal therefore and displaying a corresponding value of emissivity.

From the foregoing, it will be apparent that all of the objectives of this invention have been achieved by the structures and method shown and described herein. It also will be apparent, however, that various changes may be made by those skilled in the art without departing from the spirit of the invention as expressed in the appended claims. It is to be understood, therefore, that all matter shown and described is to be interpreted as illustrative and not in a limiting sense.

We claim:

1. A radiometric system for simultaneously measuring the temperature and the emissivity of a radiating body in accordance with theoretical data derived for an ideal linear detector, the system comprising:

idealized ratio pyrometer means for generating two idealized brightness pyrometer signals in response to radiation received from the radiating body, each of the brightness pyrometer signals having respective components related to an associated constant factor, emissivity, and temperature of the radiating body, and producing an idealized ratio output signal independent of emissivity and indicative of the temperature of the radiating body; and emissivity circuit means operatively connected to the ratio pyrometer means for comparing the ratio output signal with one of the brightness pyrometer signals, and producing an output signal independent of the temperature and indicative of the emissivity of the radiating body.

2. a radiometric system as set forth in claim 1 wherein the ratio pyrometer means includes first and second brightness pyrometer means for receiving respective radiation intnesities emitted simultaneously from the radiating body and producing proportionate output signals in conformity with theoretical data derived for an ideal linear detector.

3. A radiometric system as set forth in claim 2 wherein the emissivity circuit means includes signal comparing means operatively connected to the ratio pyrometer means for receiving corresponding output signals produced by the ratio pyrometer means and said brightness pyrometer means, respectively, and producing a ratio output signal having a temperature component substantially equal to one and an emissivity component proportionate to the emissivity of the radiating body.

4. A radiometric system as set forth in claim 2 wherein the emissivity circuit means includes signal enhancing means operatively connected to the ratio pyrometer means for effectively eliminating the constant factor components of respective output signals produced by the ratio pyrometer means and said one of the brightness pyrometer means and producing an output signal substantially independent of the constant factor components.

5. A radiometric system as set forth in claim 2 wherein the first and second brightness pyrometer means include respective first and second radiation selecting means for receiving radiation emitted from the radiating body and restricting passage thereof to radiation intensities associated with respective wavelengths of interest, the wavelengths being suitably close to one another in the spectrum to represent an emissivity ratio substantially equal to one.

6. A radiometric system as set forth in claim 5 wherein the first and second brightness pyrometer means include respective first and second radiation detecting means operatively coupled to the first and second radiation selecting means, respectively, for receiving radiation intensities therefrom and producing corresponding exponentially variable output signals having respective components related to an associated constant factor, emissivity, and temperature of the radiating body.

7. A radiometric system as set forth in claim 6 wherein the first and second brightness pyrometer means include respective first and second signal linearizing means operatively connected to the first and second radiation detecting means, respectively, for receiving the exponentially variable output signals therefrom and producing corresponding linearly variable signals having respective components related to an associated constant factor, emissivity and temperature of the radiating body.

8. A radiometric system as set forth in claim 7 wherein the first and second brightness pyrometer means include respective first and second signal idealizing means operatively connected to the first and second signal linearizing means, respectively, for receiving the linearly variable output signals therefrom and producing corresponding idealized output signals in conformity with theoretical data derived for an ideal linear detector, each of the idealized output signals having respective components related to an associated constant factor, emissivity, and temperature of the radiating body, the emissivity components of corresponding idealized output signals produced by the first and second idealizing means being substantially equal to one another.

9. A radiometric system as set forth in claim 8 wherein the ratio pyrometer means includes signal ratio means operatively connected to the first and second linearizing means, respectively, for receiving the idealized output signals therefrom and producing a corresponding idealized ratio output signal independent of emissivity and indicative of the temperature of the radiating body.

10. A radiometric system as set forth in claim 9 and including a temperature indicating means operatively connected to the signal ratio means for receiving the idealized ration output signal therefrom and displaying a corresponding temperature of the radiating body.

11. A radiometric system as set forth in claim 9 wherein the emissivity circuit means includes signal conforming means operatively connected to one of the signal idealizing means for receiving the output signal therefrom as an input signal and producing a corresponding output signal having a temperature component substantially equal to the temperature component of the output signal produced by the signal ratio means.

12. A radiometric system as set forth in claim 11 wherein the signal conforming means includes signal reducing means for decreasing the magnitude of the input signal received from the signal idealizing means and producing an output signal having corresponding constant factor, emissivity, and temperature components uniformly reduced in magnitude accordinly, the resulting temperature component being equal in magnitude to the temperature component of the output signal produced by the signal ratio means.

13. A radiometric system as set forth in claim 11 wherein the emissivity circuit means includes signal comparing means operatively connected to the signal conforming means and to the signal ratio means for receiving corresponding output signals therefrom as respective input signals, the signal comparing means including ratio circuit means for effectively cancelling the subtantially equal temperature components of the respective input signals and producing a ratio output signal having respective components related to an associated constant factor and the emissivity of the radiating body.

14. A radiometric system as set forth in claim 13 wherein the ratio circuit means includes signal subtracting means for comparing the respective idealized linearly variable input signals and extracting the difference as an output signal equivalent to obtaining the ratio of corresponding exponentially variable signals.

15. A radiometric system as set forth in claim 13 wherein the emissivity circuit means includes signal enhancing means operatively connected to the signal comparing means for removing the constant factor component of the output signal received therefrom and amplifying the remaining emissivity component.

16. A radiometric system as set forth in claim 15 wherein the signal enhancing means includes negative signal generating means for removing the constant factor component by combining it with an oppositely polarized signal of equal magnitude.

17. A radiometric system as set forth in claim 15 wherein the signal enhancing means includes signal restoring means for amplifying the remaining emissivity component to equal the emissivity component of the corresponding output signal produced by said one of the brightness pyrometer means.

18. A radiometric system as set forth in claim 17 wherein the emissivity circuit means includes signal delinearizing means operatively connected to the signal enhancing means for receiving the linearly variable output signal therefrom and producing a corresponding exponentially variable output signal in conformity with the exponentially variable signal produced by the associated radiation detecting means.

19. A radiometric system as set forth in claim 18 wherein the signal delinearizing means includes antilog circuit means for producing an exponentially variable signal equal to the emissivity component of the corresponding output signal produced by the associated radiation detecting means in proportion to radiation intensity received from the radiating surface.

20. A radiometric system as set forth in claim 18 and including emissivity indicating means operatively connected to the signal delinearizing means for receiving the exponentially variable output signal therefrom and displaying the corresponding value of emissivity.

21. A method of idealizing the output of an actual radiation detector to conform with the output of an ideal linear detector, the method comprising the steps of:
calculating the output of an ideal lindear detector receiving a particular wavelength of black body radiation at a series of selected temperatures;
plotting the calculated values to obtain an ideal detector output versus black body temperature curve;
finding a $T^n$ curve equation having a constant factor component and an exponentially variable temperture factor component which conforms closely to the plotted curve of calculated values;
taking the log 10 of the equation to obtain a calculated value equation of a linear curve having a slope equal to $n$;
measuring the output of an actual detector receiving the particular wavelength of black body radiation at a series of selected temperatures;
plotting the measure values to obtain an actual detector output versus black body temperature curve;
finding a $T^{nm}$ curve equation having a constant factor component and an exponentially variable temperature factor component which conforms closely to the plotted curve of measured values;
taking the log 10 of the equation to obtain a resulting measured value equation of a linear curve having a slope equal to $nm$; and
dividing the resulting measured value equation by the factor $m$ to obtain a measured value equation of a linear curve having a slope equal to $n$.

* * * * *